(12) United States Patent
Fries et al.

(10) Patent No.: US 11,559,930 B2
(45) Date of Patent: Jan. 24, 2023

(54) INJECTION-MOULDED COMPONENT, JOINT, INJECTION-MOULDING DEVICE, AND METHOD FOR PRODUCING AN INJECTION-MOULDED COMPONENT

(71) Applicant: ILLINOIS TOOL WORKS INC., Glenview, IL (US)

(72) Inventors: Elmar Fries, Röttingen (DE); Stefan Zöller, Mönchberg (DE); Pramod Morale, Pune (IN)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/748,672

(22) PCT Filed: Aug. 9, 2016

(86) PCT No.: PCT/US2016/046163
§ 371 (c)(1),
(2) Date: Jan. 30, 2018

(87) PCT Pub. No.: WO2017/034791
PCT Pub. Date: Mar. 2, 2017

(65) Prior Publication Data
US 2019/0001539 A1  Jan. 3, 2019

(30) Foreign Application Priority Data
Aug. 27, 2015 (DE) ............ 10 2015 114 270.8

(51) Int. Cl.
*B29C 45/14* (2006.01)
*B29C 45/00* (2006.01)
(Continued)

(52) U.S. Cl.
CPC ...... *B29C 45/14032* (2013.01); *B29C 33/126* (2013.01); *B29C 45/0001* (2013.01);
(Continued)

(58) Field of Classification Search
CPC .......... B29C 45/1671; B29C 45/14032; B29C 45/14008; B29C 45/001; B29C 45/0017;
(Continued)

(56) References Cited

U.S. PATENT DOCUMENTS

| 2,268,904 | A | * | 1/1942 | Schallis | .......... | E05B 85/12 292/1 |
| 5,964,009 | A | * | 10/1999 | Hoepfl | ............ | B25G 1/105 16/430 |

(Continued)

FOREIGN PATENT DOCUMENTS

| CH | 634 505 | 2/1983 |
| CN | 1183345 | 6/1998 |

(Continued)

OTHER PUBLICATIONS

Translation of JPH0218020A (bib and description). (Year: 1990).*
(Continued)

*Primary Examiner* — Catherine A. Simone
(74) *Attorney, Agent, or Firm* — Thompson Hine LLP

(57) ABSTRACT

An injection-molded component having a casing body of plastics material and a core which is made of a core material, in particular of a metal, which is at least partially received within the casing body and is at least partially insert-molded. The injection-molded component may in particular serve as a joint part of a joint. As a result of the preferably metallic core, the injection-molded component, despite comparatively small dimensioning, is capable of being comparatively highly stressed. By virtue of the casing body of plastics material, a minor actuation noise may be implemented for the joint, even without complex lubrication.

5 Claims, 2 Drawing Sheets

Figure 1:
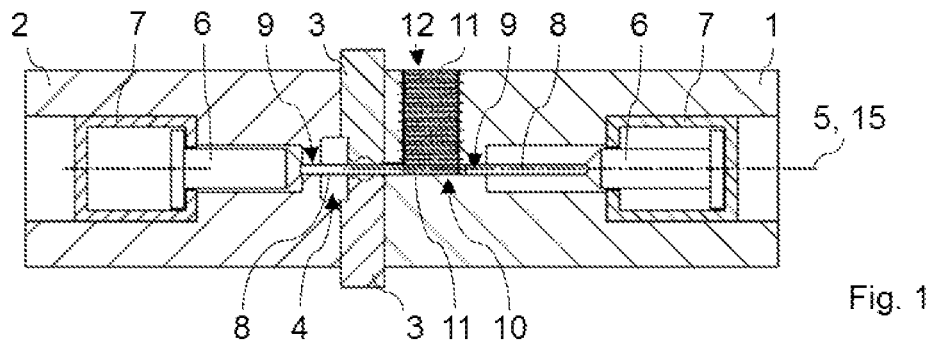

(51) Int. Cl.
*B29C 33/12* (2006.01)
*B29C 45/73* (2006.01)
*B29L 31/26* (2006.01)

(52) U.S. Cl.
CPC .......... *B29C 45/0017* (2013.01); *B29C 45/14* (2013.01); *B29C 45/14065* (2013.01); *B29C 45/14262* (2013.01); *B29C 45/73* (2013.01); *B29C 2045/14131* (2013.01); *B29L 2031/26* (2013.01); *Y10T 428/24479* (2015.01); *Y10T 428/24777* (2015.01)

(58) Field of Classification Search
CPC .............. B29C 45/14; B29C 45/14065; B29C 45/14262; B29C 45/73; B29C 33/126; B29C 2045/14131; B29C 45/0001; B29L 2031/26; Y10T 428/24479; Y10T 428/24777
See application file for complete search history.

(56) References Cited

U.S. PATENT DOCUMENTS

| | | | | |
|---|---|---|---|---|
| 6,113,832 A | * | 9/2000 | Tanaka | B29C 45/0005 264/108 |
| 6,676,875 B1 | | 1/2004 | Takeuchi | |
| 7,845,252 B2 | * | 12/2010 | Vermeersch | F16H 61/26 74/473.31 |
| 2006/0045931 A1 | | 3/2006 | Ito | |
| 2009/0163955 A1 | * | 6/2009 | Moumene | A61B 17/701 606/257 |
| 2009/0182380 A1 | * | 7/2009 | Abdelgany | A61B 17/7037 606/301 |
| 2010/0087264 A1 | | 4/2010 | Suzuki | |
| 2011/0059803 A1 | * | 3/2011 | Kozlowski | F16J 3/042 464/141 |
| 2014/0070453 A1 | | 3/2014 | Dietl | |

FOREIGN PATENT DOCUMENTS

| | | |
|---|---|---|
| CN | 1402665 A | 3/2003 |
| CN | 101437670 A | 5/2009 |
| CN | 201530093 U | 7/2010 |
| CN | 102862153 A | 1/2013 |
| CN | 103648742 A | 3/2014 |
| DE | 251 103 | 11/1987 |
| DE | 100 63 811 | 6/2002 |
| JP | S51 68665 | 6/1976 |
| JP | S60 64816 | 4/1985 |
| JP | H0218020 A * | 1/1990 |

OTHER PUBLICATIONS

PCT, International Search Report and Written Opinion, International Application No. PCT/US2016/046163; dated Nov. 16, 2016, 12 pages.

* cited by examiner

INJECTION-MOULDED COMPONENT, JOINT, INJECTION-MOULDING DEVICE, AND METHOD FOR PRODUCING AN INJECTION-MOULDED COMPONENT

The invention relates to an injection-molded component, and to a joint having such an injection-molded component. The invention furthermore relates to a method for producing such an injection-molded component, and to an injection-molding device which is suitable for carrying out such a method.

Joints in the technical sense are movable connections between two components, wherein the relative movement of these components may be rotation (rotary joints) and/or displacement (sliding joints). In the case of one type of joints, the two movably connected components by way of respective contact faces or anti-friction faces slide directly on one another. It is in particular in the case of such (sliding) joints that the issue of an actuation noise (joint squeak) arises. This is particularly pronounced when both movably connected components of the joint are configured from metal and in particular from steel. An actuation noise can be prevented from arising by lubricating the anti-friction faces. Furthermore, an actuation noise may typically also be prevented from arising in that at least one of the components is configured from a plastics material. However, plastics materials which are employable to this end in a cost-effective manner are typically capable of being stressed to a significantly lesser extent that the metal which is to be replaced by said plastics materials. This disadvantageous material property then has to be compensated for by way of a larger dimension of the (plastics material) component. However, this is associated with an increase in size which may be problematic in terms of an envisaged application.

Proceeding from this prior art, the invention is based on the object of stating a joint which despite having minor dimensions is capable of being comparatively highly stressed and at the same time is distinguished by an absent or a comparatively minor actuation noise.

This object is achieved by a joint as claimed in patent claim 7, having a specific injection-molded component as is claimed in patent claim 1. A method for producing such an injection-molded component is the subject matter of patent claim 8. An injection-molding device which is suitable for carrying out such a method is the subject matter of patent claim 10. Advantageous design embodiments of the injection-molded component and thus of the joint according to the invention and of the injection-molding device according to the invention, and advantageous embodiments of the method according to the invention are the subject matter of the respective dependent claims and are derived from the following description of the invention.

The invention is based on the concept that the issues described in the case of the known joints, specifically an increased actuation noise, or the required lubrication of the contact faces in the case of joints of metal, or a comparatively large installation space in the case of joints of plastics material may be advantageously avoided if for at least one of the mutually movable components of the joint a core of a highly stressable material and in particular of a metal is used which in at least that region in which said core configures the contact face which is required for the joint to function is surrounded by a plastics-material layer (casing body). In order for such a bi-component part to be able to be advantageously produced at the same time, it is a further concept of the invention for the core of the highly stressable material to be (at least partially) insert molded with the plastics material for the casing body.

Accordingly, an injection-molded component having a casing body of plastics material is provided, said injection-molded component having a core of a core material, which is at least partially received within the casing body and is at least partially insert-molded.

A "core material" is understood to be a material which deviates from the plastics material of the casing body and which preferably, in comparison with the plastics material of the latter is capable of being more highly stressed. Herein, the higher level of stressability may result in particular from a strength (tensile strength and/or burst strength and/or compressive strength and/or flexural strength and/or torsional strength and/or shear strength) which in comparison with the plastics material of the casing body is higher. Additionally or alternatively, the higher level of stressability may also result from a comparatively high level of ductility and/or hardness, and/or from a comparatively high elasticity modulus. A metal and in particular steel may be preferably employed as the core material.

The core herein is considered "insert molded" if the free-flowing plastics material which in particular may be a thermoplastics material, in the context of an injection-molding process for producing the injection-molded component is brought into direct contact with the core and is cured there, so as to configure a connection between the core and the casing body. The connection herein between the core and the casing body may be based exclusively on a materially integral fit and/or on a force-fit. However, it may preferably be provided that the connection (at least in one direction) is also based on a form-fit in that the core is insert molded in at least one portion in which said core configures a geometric variance (for example a step, a diameter variation, a depression, a protrusion, etc.).

It may furthermore preferably be provided for the injection-molded component according to the invention that an external face of the casing body is configured as an anti-friction face.

A joint according to the invention, beside an injection-molded component according to the invention, in such a design embodiment comprises yet at least one joint component which is mounted so as to be movable on the anti-friction face of the injection-molded component. Herein, this (further) joint component may likewise be configured as a joint component according to the invention. However, said (further) joint component may also be completely, or at least in that portion that is provided for contacting the anti-friction face of the injection-molded component according to the invention, configured from an arbitrary material, in particular from a metal, without disadvantages in terms of the targeted stressability and at the same time a minor actuation noise and a minor installation space being associated therewith. It may likewise be provided that the (further) joint component is completely configured from plastics material.

A method according to the invention for producing an injection-molded component according to the invention comprises as least:
 automated infeeding and positioning of the core in a cavity of an injection-molding tool; and
 subsequent insert-molding of the core (in at least one position) with the plastics material for configuring the casing body.

An injection-molding device which may be employed in particular in the context of carrying out a method according to the invention comprises at least one injection-molding tool which comprises at least two tool parts which are (mutually) displaceable between a closed position, in which they configure a closed cavity, and an opened position (in which a respective injection-molded component which is configured by curing a previously free-flowing plastics material is demoldable on the outside of the cavity), and an injection device for injecting a plastics material in free-flowing form into the cavity, wherein means for infeeding and positioning a core of a core material in the cavity of the injection-molding tool are moreover provided.

It may be advantageous in particular in terms of the capability of production in the context of an (injection-molding) method according to the invention, for the core to have as simple a geometry as possible and in particular a cylindrical external contour. On account thereof, automated infeeding of the core to the cavity of the injection-molding tool may in particular be simplified. Moreover, on account thereof it may be enabled that semi-finished products of the core material, in particular semi-finished metal products, may be resorted to in a cost-effective manner for the production of the core, or of a plurality of cores, respectively, for the injection-molded components according to the invention.

In consequence, in as far as a comparatively complex shape is provided for the external contour of the injection-molded component, it may be advantageous for a core having a comparatively simple geometry or external contour, respectively, to be used, and for the comparatively complex external contour of the injection-molded component to be largely or completely configured by a corresponding shaping of the casing body of plastics material, on account of which the casing body may consequently have an external contour which in terms of shape deviates from the external contour of the core.

Automated infeeding of the core to the cavity of the injection-molding tool may preferably be performed in that said core is infed to the cavity and positioned therein by means of at least two positioning elements which are displaceable in a parallel or coaxial manner and engage at mutually opposite ends of the core. The injection-molding device according to the invention to this end may comprise at least two positioning elements which are displaceable in a parallel or coaxial manner and are provided so as to engage on mutually opposite ends of the core.

In one furthermore preferred design embodiment of the injection-molded component according to the invention it may be provided that the core at two mutually opposite ends has in each case one retaining depression or a retaining protrusion. In the case of a core having a cylindrical external contour or a cylindrical shell surface, respectively, the retaining depressions or retaining protrusions may in particular be disposed in the end-side end faces (preferably so as to be central therein). Accordingly, it may be provided for the injection-molding device according to the invention that the positioning elements, on the contact faces which are provided for engaging on the core, configure a retaining protrusion or a retaining depression. Automated infeeding of the core to the cavity of the injection-molding tool may in particular be simplified by providing the retaining depressions or the retaining protrusions. Moreover, on account thereof, sufficiently positive positioning of the core during insert-molding of the core with the plastics material may be guaranteed, in the case of which insert molding significant forces may act on the core.

It may serve in particular for achieving self-centering and thus as accurate a positioning as possible of the core within the cavity, for the retaining depression or the retaining protrusion of the core and/or of the injection molding device to be configured so as to taper off, for example in the form of a (truncated) cone.

In one preferred design embodiment of the injection-molding device according to the invention, means for infeeding the core in the radial direction (in relation to the longitudinal axis) into a guide duct which extends along the motion axis of at least one of the positioning elements may be provided. This represents a solution which in constructive terms is advantageous for infeeding the core to the positioning element(s).

Herein, it may be particularly preferably provided that the means for infeeding the core are configured for storing a plurality of cores, on account of which a serial production of injection-molding components according to the invention with short cycle times may be positively influenced.

The indefinite articles ("a", "of a"), in particular in the patent claims and in the preceding description which explains the patent claims in general terms, are to be understood as such and not as numerals. Components which are accordingly specified therewith are thus to be understood as being present at least once and as being potentially present in multiples.

Figure 6:
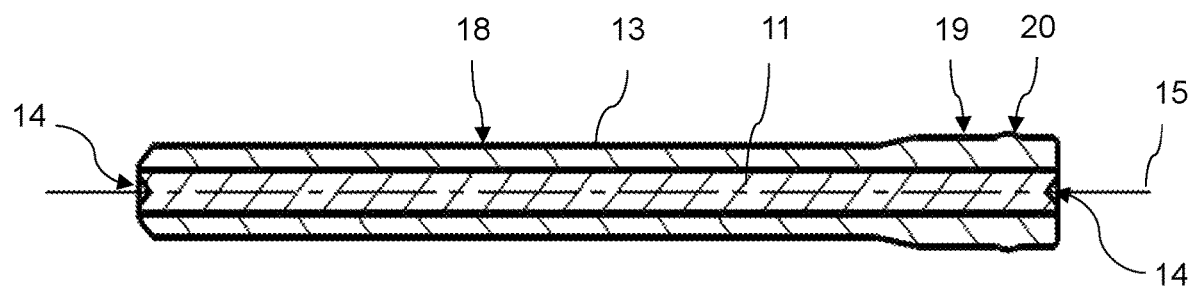

The invention will be explained in more detail hereunder by means of an exemplary embodiment which is illustrated in the drawings in which:

FIGS. 1 to 5 schematically show various steps of a method according to the invention for producing an injection-molded component according to the invention; and FIG. 6 shows a longitudinal section of an injection-molded component according to the invention, in an alternative design embodiment.

FIGS. 1 to 5 in a simplified illustration show various steps of a method according to the invention for producing an injection-molded component according to the invention. The injection-molding device according to the invention used for carrying out this method comprises an injection-molding tool having two main tool parts 1, 2, and two further tool parts which as so-called slides 3 are displaceable in a transverse manner and, specifically, in the present case perpendicularly in relation to a (relative) motion axis of the main tool parts 1, 2. The main tool parts by means of means (not illustrated) are (mutually) displaceable between a closed position which configures a closed cavity 4 (cf. FIGS. 1 to 3), and an opened position (cf. FIGS. 4 and 5) which enables demolding of an injection-molded component which has been cured in the cavity 4 of the injection-molding tool. In the present exemplary embodiment, only one (2) of the main tool parts 1, 2 is displaceable along the motion axis 5, while the other main tool part 1 is configured so as to be stationary. However, it is likewise possible for both main tool parts 1, 2 to be configured so as to be displaceable. The slides 3 in the exemplary embodiment shown are coupled to the displaceable main tool part 2, and are thus entrained conjointly with the latter along the motion axis 5 of the main tool parts 1, 2.

FIG. 1 shows a first step in the production of an injection-molded component according to the invention, in the context of a method according to the invention. Said first step is characterized by closing the injection-molding tool and by displacing two positioning elements of the injection-molding device to a collection position. The positioning elements in a coaxial alignment are disposed at mutually opposite ends of the cavity 4, each comprising, for example, a hydraulically (or alternatively pneumatically or electro-motively, for example) displaceable piston 6 which is guided in a cylinder tube 7 and which at the free end thereof is connected (optionally in an integral manner) to a cylindrical positioning bar 8 which is guided in a guide duct 9 which is configured by the respective main tool part 1, 2. The coaxial arrangement of the positioning elements herein relates at least to the two positioning bars 8. In the exemplary embodiment shown, the associated hydraulic cylinders (composed of the piston 6 and of the cylinder tube 7) are also aligned so as to be mutually coaxial.

In the collection position, the piston 6 of the positioning element which is disposed within the stationary main tool part 1 is completely retracted into the associated cylinder tube 7. The associated positioning bar 8 herein terminates just ahead of the one end, which in relation to the cavity 4 is the distal end, of a transfer portion 10 of the guide duct 9 of the stationary main tool part 1. A core 11 which, in order to configure an injection-molded component according to the invention, is intended to be introduced into the cavity 4 and may be composed of steel, for example, may be infed to this transfer portion 10. This may be performed purely by gravity, for example, by the core 11 dropping from a storage receptacle 12 which is disposed above the transfer portion 10 and which is configured in the stationary main tool part 1 and is dimensioned in such a manner that said storage receptacle may receive a plurality of respective cores 11 simultaneously. Herein, dropping and thus transferring a core 11 into the (empty) transfer portion 10 is always performed when (in the collection position) the positioning bar 8 of the positioning element of the stationary main tool part 1 is not disposed within the transfer portion 10.

By contrast, the positioning bar 8 of the positioning element of the displaceable main tool part 2 is never located within the transfer portion 10 which is configured by the guide duct 9 of the stationary main tool part 1. Rather, said positioning bar terminates just ahead of the other end, which in relation to the cavity 4 is the proximal end, of the transfer portion 10 when (in the collection position of the positioning elements) the associated piston 6 is located in the completely deployed position within the associated cylinder tube 7. In the collection position, the positioning bar 8 of the positioning element of the displaceable main tool part 2 thus penetrates through the cavity 4.

The cores 11 have a cylindrical shell surface without steps or any other diameter variations, simplifying infeeding to the cavity 4 by means of the positioning elements. The diameter of the shell surfaces of the cores 11 corresponds substantially to the diameter of the positioning bars 8 which are likewise configured so as to be cylindrical and without diameter variations, on account of which both the cores 11 and the positioning bars 8 are guided with a comparatively minor clearance within the correspondingly dimensioned guide ducts 9.

Figure 2:
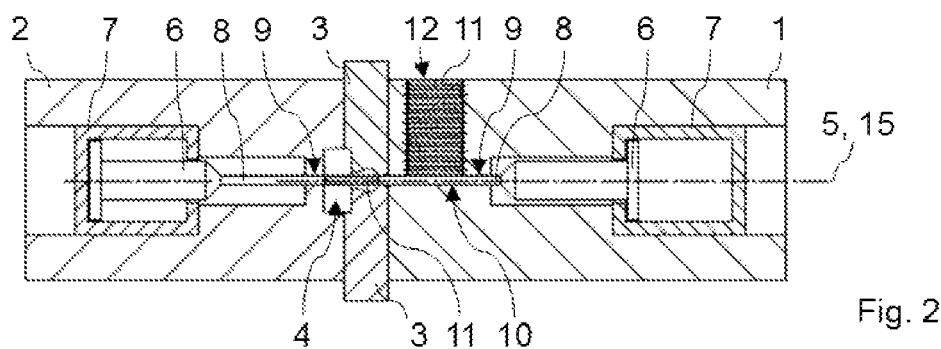

Proceeding from the collection position illustrated in FIG. 1, a core 11 which is located in the transfer portion of the guide duct 9 of the stationary main tool part 1, by collectively displacing the pistons 6 and thus the positioning bars 8 of the two positioning elements, are infed to the respective other terminal position within the associated cylinder tubes 7 of the cavity 4 and are positioned (retained) therein ("injection position"; cf. FIG. 2). As is shown for the exemplary embodiment, the core 11 in this injection position may be disposed exclusively in the cavity 4 and thus completely outside the guide ducts 9. In order for a sufficiently positive positioning of the core 11 to be nevertheless guaranteed within the cavity 4, despite the significant forces which during the injection of plastics material for configuring a casing body 13 for the injection-molded component to be produced act on the latter, the two end-side end faces of each core 11 each have a central retaining depression 14 (cf. in a corresponding manner to this end the alternative injection-molded component according to FIG. 6), in each of which a corresponding retaining protrusion which is configured on the end side on the free end of each positioning bar 8 may engage. By way of a conical shape of the retaining depressions 14 as well as of the retaining protrusions, the resulting combinations act in a self-centering manner such that a coaxial alignment of the positioning bars 8 and of the core 11 held by the latter, and thus also of this core 11 within the casing body 13 of plastics material, the external contour of the latter potentially being configured so as to be entirely or at least partially rotationally symmetrical (about the longitudinal axis 15 of the core 11), may be achieved.

Figure 3:
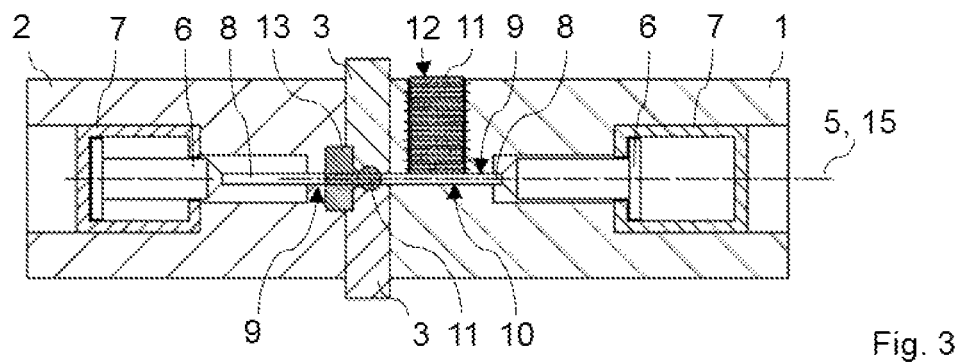
Figure 4:
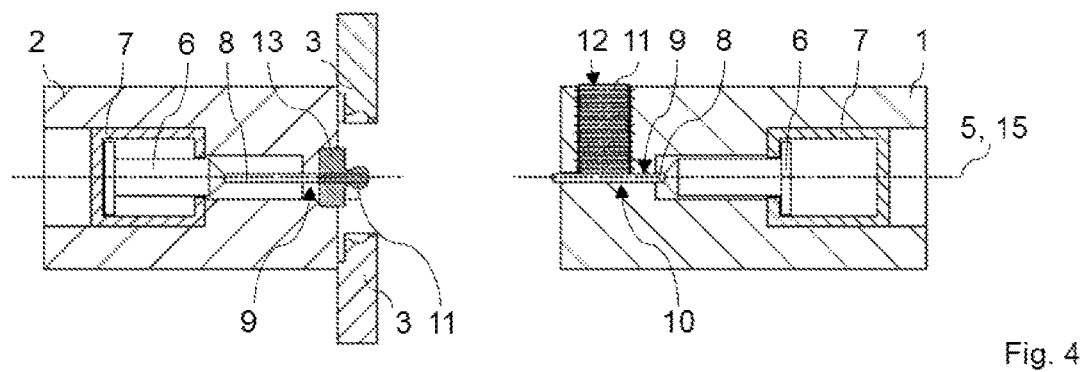
Figure 5:
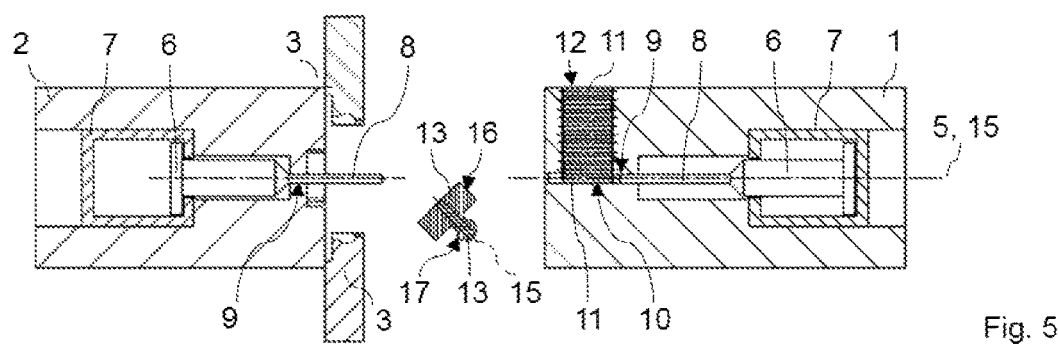

FIG. 3 elucidates the configuration of the casing body 13 of the injection-molded component to be produced, by insert-molding the core 11 with a plastics material in a free-flowing state, the latter having been introduced into the cavity 4 by way of one or a plurality of injection openings (not illustrated). Herein, the core 11 in the exemplary embodiment shown is disposed across the entire length within the casing body 13. At the same time, the core 11 in the region of the entire shell surface thereof is insert-molded with the plastics material.

Upon (sufficient) curing of the plastics material configuring the casing body 13, the optionally already finished injection-molded component (the latter may optionally be post-processed) may then be demolded, to which end the injection mold is displaced to the opened position. To this end, the displaceable main tool part 2, together with the slides 3, is displaced away from the stationary main tool part 1. Additionally, the slides 3 are displaced radially outward (in relation to the longitudinal axis 15 of the core 11, or of the injection-molded component, respectively) (cf. FIG. 4). Subsequently, the injection-molded component may be ejected from that portion of the cavity 4 that is configured by the movable main tool part 2 in that the positioning element of this main tool part 2 is again deployed (cf. FIG. 5). Herein, the positioning element of the stationary main tool part 1 may simultaneously be retracted again. This may be provided in particular when the two positioning elements are integrated in the same hydraulic control circuit such that retracting the one positioning element leads to simultaneous deployment of the other positioning element along a substantially identical path (and vice-versa). Such integration of the positioning elements in the same hydraulic control circuit may lead to a design embodiment of the injection-molding device which is comparatively simple in terms of both construction and control technology.

The injection-molded component which is produced according to FIGS. 1 to 5 comprises a fastening part 16 which may be provided for fastening to an arbitrary support structure (not illustrated), and a partially spherical joint part 17 which extends from one side of the fastening part 16 and of which the external face serves as an anti-friction face on which a likewise partially spherical and internal anti-friction face of a (further) joint component (not illustrated) may be mounted in a sliding manner. On account thereof, the injection-molded component produced, in the function thereof as a joint component, and the further joint component configure a (rotary) joint according to the invention. It can be clearly seen that in the case of this injection-molded component the casing body 13 has an external contour which in terms of shape deviates from the (cylindrical) external contour of the core 11.

This also applies to the alternative injection-molded component which is illustrated in FIG. 6 and which represents an axle-shaped joint component, a further joint component (not shown) being potentially mounted in a sliding manner (in at least one portion) on the shell surface of said axle-shaped joint component. A rotary joint as well as a sliding joint as well as a combined rotary-cum-sliding joint may be configured herein. The external contour of the casing body 13 of this injection-molded component is cylindrical in a first portion 18 (with machined ends), transitioning in a conically widening manner into a second portion 19 which is also substantially cylindrical but in one region configures an encircling bulge 20. By contrast, the core 11 (at least in terms of shape) corresponds to that core which is used in the production of an injection-molded component according to FIGS. 1 to 5 and which thus across the entire length has a cylindrical external contour without diameter variation.

Production of the injection-molded component according to FIG. 6 may be performed in an injection-molding device which, except for the shape of the cavity 4, corresponds to the injection-molding device according to FIGS. 1 to 5. The integration of slides 3 in the injection-molding tool may optionally be dispensed with such that the latter may only be configured from two main tool parts 1, 2, since the injection-molded component according to FIG. 6 does not configure any undercut in relation to directions defined by the longitudinal axis 15 of said injection-molded component.

LIST OF REFERENCE SIGNS

1 Stationary main tool part
2 Displaceable main tool part
3 Slide
4 Cavity
5 Motion axis of the main tool parts
6 Piston of a positioning element
7 Cylinder tube of a positioning element
8 Positioning bar of a positioning element
9 Guide duct
10 Transfer portion
11 Core
12 Storage receptacle
13 Casing body
14 Retaining depression
15 Longitudinal axis of the core/of the injection-molded component
16 Fastening part of the injection-molded component
17 Joint part of the injection-molded component
18 First portion of the shell surface of the casing body of the injection-molded component according to FIG. 6
19 Second portion of the shell surface of the casing body of the injection-molded component according to FIG. 6
20 Encircling bulge of the shell surface of the casing body of the injection-molded component according to FIG. 6

The invention claimed is:

1. A joint, comprising:
an injection molded component including a casing body of plastics material and a core of a core material, which is at least partially received within the casing body and is at least partially insert-molded, wherein the core at two mutually opposite ends has in each case one retaining depression, wherein an external face of the casing body is configured as an anti-friction face;
a joint component which is mounted around the external face so as to be movable on the external face of the injection-molded component.

2. The joint as claimed in claim 1, characterized in that the casing body has an external contour which in terms of shape deviates from the external contour of the core.

3. The joint as claimed in claim 1, characterized in that the core has a cylindrical external contour.

4. The joint as claimed claim 1, characterized in that the retaining depression is configured so as to taper off.

5. A joint, comprising:
an injection molded component including a casing body of plastics material and a core of a core material, which is at least partially received within the casing body and is at least partially insert-molded; wherein the casing body has an external contour which in terms of shape deviates from the external contour of the core, wherein the core has a cylindrical external contour, wherein the core at two mutually opposite ends has in each case one retaining depression, wherein the retaining depression is configured so as to taper off, wherein an external face of the casing body is configured as an anti-friction face; and
a joint component which is mounted around the external face so as to be movable on the external face of the injection-molded component.

* * * * *